Patented Apr. 3, 1951

2,547,241

UNITED STATES PATENT OFFICE 2,547,241

GENTISIC ACID AND ITS ALKALI METAL AND AMMONIUM SALTS

Ferdinand B. Zienty, Brentwood, and Dorothy J. Harvey, St. Louis, Mo., assignors to Monsanto Chemical Company, St. Louis, Mo., a corporation of Delaware No Drawing. Application March 16, 1950, Serial No. 150,102

21 Claims. (Cl. 260—521)

This invention relates to 2,5-dihydroxybenzoic acid, or as it is more commonly called, gentisic acid, and its alkali metal or ammonium salts; more specifically, this invention relates to an improved process for the production of gentisic acid and its alkali metal and ammonium salts.

The Kolbe synthesis has generally been considered to be a most convenient method for preparing hydroxy aromatic carboxylic acids and their alkali metal salts. Basically this synthesis consists in the preparation of the anhydrous alkali metal phenolate to be carboxylated followed by the subjection of the alkali metal phenolate to the action of gaseous carbon dioxide under relatively high pressures and at elevated temperatures. Originally this synthesis was carried out in the absence of any liquid diluent or liquid reaction medium. In such instances the solid anhydrous alkali metal phenolate was prepared and charged to an autoclave wherein it was carboxylated with $CO_2$. Subsequent investigations revealed carboxylation processes could be carried out on an alkali metal phenolate dissolved or suspended in anhydrous inert organic medium. In such a process, the alkali metal phenolate is generally separately prepared by reacting an alkali metal hydroxide with the phenol in the organic medium and stripping off the water formed in this reaction. In either of these processes, commercially practical yields of the desired hydroxy aromatic carboxylic acid could be obtained only if anhydrous conditions are maintained. The presence of water, either in small amounts as a contaminant or as the liquid carrier, retarded the reaction so significantly that either no product was obtained or else it was obtained in insignificant yields, depending upon the particular alkali metal phenolate being carboxylated.

In either of the above mentioned processes, there exist some inherent disadvantages. The desirability of maintainnig anhydrous conditions dictates the necessity of preparing the alkali metal phenolate as a separate and distinct step in the process. Furthermore, the maintenance of anhydrous conditions requires careful process control and the availability of dehydration facilities. Carboxylation with considerable quantities of externally supplied gaseous $CO_2$ requires costly equipment and spacious storage facilities.

In our copending application Serial No. 94,512, filed May 20, 1949, an improved process for the production of gentisic acid and its alkali metal and ammonium salts was disclosed and claimed. As was pointed out therein, the process disclosed and claimed, which comprises reacting hydroquinone with an alkali metal or ammonium carbonate or bicarbonate in a medium containing water at a temperature in the range of from about 175° to about 200° C., and a total pressure in excess of about 200 pounds per square inch, constituted a significant improvement over those processes disclosed in the prior art in that an excellent yield of gentisic acid could be obtained in a single step process which did not require the maintenance of anhydrous conditions. While that process constituted a most significant advancement in the art, considerable room for improvement was still possible. While that process provided for an excellent yield of gentisic acid based on recovered hydroquinone, the actual conversion of hydroquinone to gentisic acid, while equal to or superior to that previously obtained in the art, was still relatively low, namely, about 30%. It was further found that the crude gentisic acid obtained from that process contained a considerable amount of highly colored, tarry side products. While the gentisic acid thus obtained could be purified and an excellent yield of substantially pure material obtained, purification was somewhat difficult in that repeated recrystallizations were required in order to eventually obtain a white product free from colored bodies.

It is an object of this invention, therefore, to provide an improved process for the production of 2,5-dihydroxybenzoic acid (gentisic acid) and its alkali metal and ammonium salts. It is another object of this invention to provide an improved and highly practical process for the production of gentisic acid and its alkali metal and ammonium salts in increased yields and in increased conversion by the carboxylation of an alkali metal or ammonium salt of hydroquinone, wherein the formation of the alkali metal or ammonium salt of hydroquinone and its subsequent carboxylation are carried out as an essentially single step in the presence of water. Further objects will become apparent from the description of the novel process of this invention and the claims.

It has now been discovered that gentisic acid or its alkali metal or ammonium salts may be obtained in excellent and increased yields by subjecting the alkali metal or ammonium salt of hydroquinone (para-dihydroxy benzene) to reaction with carbon dioxide in the presence of water and the sulfide ion, at a temperature in the range of from about 150° C. to about 180° C. and a pressure in excess of about 200 pounds per square inch. According to a preferred embodiment of this invention the novel process may be carried out by reacting hydroquinone with an alkali metal or ammonium carbonate or bicarbonate in a medium containing water and the sulfide ion, at a temperature in the range of from about 150° C. to about 180° C., and a total pressure in excess of about 200 pounds per square inch. Under such conditions, it has been found that the alkali metal or ammonium carbonate or bicarbonate reacts with hydroquinone to form the alkali metal or ammonium salt of hydroquinone and liberates gaseous $CO_2$ which then acts as a carboxylating agent, thereby converting a much higher percentage of the hydroquinone to the alkali metal salt of gentisic acid than was heretofore obtainable. Thus, according to the novel process of this invention, it is now possible to obtain a 40–50% conversion of hydroquinone to gentisic acid.

The following examples are illustrative of the novel process of this invention:

Example I

An iron autoclave was charged with 55 g. of hydroquinone, 100 g. of potassium bicarbonate, 2 g. of sodium sulfide nonahydrate and 100 ml. of water. The autoclave was then swept clear of air with $CO_2$ and an initial pressure of 100 pounds per square inch of $CO_2$ applied. With constant agitation the autoclave was heated to 165–170° C. and at this temperature the pressure rose to approximately 450–500 pounds per square inch, at which temperature and pressure the reaction was maintained for 12 hours.

The autoclave was then cooled, vented and the reaction product removed by allowing the autoclave to drain and washing the autoclave with 100 ml. of water. The reaction mixture was then acidified with hydrochloric acid to a pH of 7.0, and the unreacted hydroquinone extracted with butanol. The water layer was then acidified to a pH of 1–2 with hydrochloric acid and the gentisic acid extracted with butanol. Titration of the butanol layer containing gentisic acid indicated that approximately a 40% conversion of hydroquinone to gentisic acid had been obtained. The butanol layer containing gentisic acid was then evaporated to recover the gentisic acid. The recovered gentisic acid was then recrystallized from water, whereby fine white needle crystals of gentisic acid having a melting point of 205–206° C. were obtained.

The butanol layer containing the unreacted hydroquinone previously obtained, was then evaporated and unreacted hydroquinone recovered. On the basis of recovered hydroquinone, it was found that approximately an 80% yield of gentisic acid had been obtained.

Example II

The critical nature of the temperature limitations of this reaction was illustrated by repeating the procedure described in Example I with the exception that the reaction temperature was maintained at about 140° C. In this case an impractical low conversion of hydroquinone was obtained.

Example III

As further illustration of the critical nature of the temperature limitations of this reaction, the procedure described in Example I was repeated with the exception that the reaction temperature was maintained at about 210° to 215° C. Under such conditions the yield and quality of the gentisic acid thus obtained was significantly lower than that obtained in Example I.

Example IV 55 g. of hydroquinone, 84 g. of sodium bicarbonate, 1 g. of potassium sulfide and about 220 ml. of water were charged to an iron autoclave which was then swept clear of air with $CO_2$. Without applying an initial positive $CO_2$ pressure to the system, the autoclave was closed and heated to about 175° C., during which time the pressure rose to within the preferred pressure range of above 200 pounds per square inch where it was maintained with continuous stirring for about 12 hours.

The autoclave was then cooled and vented and the gentisic acid separated and purified in the manner described in Example I. The yield of gentisic acid obtained in this case and the conversion of hydroquinone to gentisic acid, were comparable to those obtained in Example I.

Example V

To an iron autoclave equipped with an efficient agitator is charged 55 g. of hydroquinone, 53 g. of sodium carbonate, 2.75 g. of sodium sulfide ($Na_2S$) and about 110 ml. of water. The system was swept clear of air with $CO_2$ and rapidly heated to a temperature of about 180° C. and maintained at a pressure of about 550 pounds per square inch by the periodic addition of gaseous $CO_2$. After maintaining the reaction mixture at this temperature and the pressure for about 12 hours, the autoclave was cooled and vented and an excellent yield of sodium gentisate obtained.

Example VI 55 g. of hydroquinone, 53 g. of sodium carbonate, 195 g. of ortho-dichlorobenzene, 0.5 g. of sodium sulfide and 30 g. of water were charged to an iron autoclave equipped with an agitator. With continuous stirring the autoclave was swept free of air with $CO_2$, a booster charge of 150 pounds per square inch of $CO_2$ pressure applied, and the autoclave heated rapidly to about 175° C. The pressure was raised and maintained at about 450–500 pounds per square inch for a total of 12 hours.

The autoclave was cooled and vented and the reaction mixture washed with 400 ml. of water. The mixture was filtered, and on standing, the filtrate separated into an organic layer and an aqueous layer. The water layer was separated and acidified with sulfuric acid to a pH of about 2.5 and then extracted with three 100 ml. portions of butanol. The butanol extract was treated with a saturated solution of sodium bicarbonate. The butanol layer was evaporated to recover the unreacted hydroquinone. The water layer containing the sodium salt of gentisic acid was again acidified to a pH of about 2.5 and extracted with butanol. The butanol was evaporated, thereby obtaining crude gentisic acid which was then purified by recrystallization from water obtaining an excellent yield of fine white crystals of gentisic acid having a melting point of 205° to 206° C.

Example VII

The critical nature of the temperature limitations of this reaction was again illustrated by repeating the procedure described in Example VI with the exception that the reaction temperature was maintained at about 135° C. In this case an impractical low conversion of hydroquinone was obtained.

Example VIII

As further illustration of the critical nature of the temperature limitations of this reaction, the procedure described in Example VI was repeated with the exception that the reaction temperature was maintained at about 210° to 215° C. Under such conditions the yield and quality of the gentisic acid thus obtained was significantly lower than that obtained in Example VI.

Example IX

The procedure described in Example VI was repeated with the exception that the liquid medium contained 195 g. of ortho-dichlorobenzene and 5 g. of water. In this case the yield and quality of the gentisic acid thus obtained was significantly lower than that obtained in Example VI.

Example X

An iron autoclave was charged with 55 g. of hydroquinone, 84 g. of sodium bicarbonate, 200 g. of butanol, 5.5 g. of sodium sulfide and 80 g. of water. The autoclave was swept free of air with $CO_2$ and then without applying an initial positive $CO_2$ pressure to the system, the autoclave was closed and heated to about 170° C., during which time the pressure rose to within the prescribed pressure range of above 200 pounds per square inch where it was maintained with continuous stirring for about 15 hours.

The autoclave was then cooled and vented and the gentisic acid separated and purified in the manner described in Example VI.

Example XI 110 g. of hydroquinone, 138 g. of potassium carbonate, 5 g. of potasium sulfide, 125 g. of toluene and 125 g. of water were charged to an iron autoclave equipped with an efficient agitator. The system was swept clear of air with $CO_2$ and rapidly heated to a temperature of about 160° C. The pressure was allowed to rise and maintained at a pressure of about 700 pounds per square inch by the periodic addition of gaseous $CO_2$. After maintaining the reaction mixture at this temperature and pressure for about 14 hours, the autoclave was cooled and vented, thereby obtaining an excellent yield of potassium gentisate and an excellent conversion of hydroquinone.

Example XII

An iron autoclave was charged with 55 g. of hydroquinone, 75 g. of ammonium bicarbonate, 200 g. of butanol, 1.5 g. of sodium sulfide and 75 g. of water. The autoclave was swept free of air with $CO_2$, and then without applying an initial positive $CO_2$ pressure to the system, the autoclave was closed and heated to about 170° C., during which time the pressure rose to within the prescribed range where it was maintained with continuous stirring for 14 hours. After cooling and venting the autoclave, gentisic acid was separated and purified in the manner described in Example VI.

Example XIII 110 g. of hydroquinone, 114 g. of ammonium carbonate, $(NH_4)_2CO_3.H_2O$, 130 g. of toluene, .55 g. of sodium sulfide and 110 g. of water were charged to an iron autoclave. The system was swept clear of air with $CO_2$ and then rapidly heated to a temperature of about 180° C. with constant agitation. The pressure was allowed to rise and maintained at a pressure of about 650 pounds per square inch by the periodic addition of gaseous $CO_2$. After maintaining the reaction mixture under these conditions for about 15 hours, the autoclave was cooled and vented and an excellent yield of ammonium gentisate recovered.

Example XIV 110 g. of hydroquinone, 200 g. of potassium bicarbonate, 140 g. of toluene, 5 g. of potassium sulfide, and about 115 g. of water were charged to an iron autoclave. The autoclave was closed and heated to about 180° C. during which time the pressure rose to within the prefered pressure range where it was maintained with continuous stirring for about 14 hours.

After the reaction was complete, the autoclave was cooled and vented and an excellent yield of potassium gentisate obtained.

Example XV

An iron autoclave was charged with 110 g. of hydroquinone, 168 g. of sodium bircarbonate, 5 g. of sodium sulfide, 400 g. of ortho-dichlorobenzene and 160 g. of water. The autoclave was closed and then heated to about 180° C. with continuous stirring. The pressure rose to within the prescribed pressure range where it was maintained for about 15 hours.

After this reaction period, the autoclave was cooled and vented and the gentisic acid separated and purified in the manner described in Example VI.

Example XVI

The procedure described in Example I was repeated utilizing ammonium sulfide in place of the sodium sulfide nonahydrate. An excellent yield of substantially pure gentisic acid was obtained.

Example XVII

The procedure described in Example I was repeated utilizing 2 g. of $H_2S$ in place of the 2 g. of sodium sulfide nonahydrate. The $H_2S$ was incorporated into the reaction mixture by bubbling $H_2S$ through the reaction mixture until the prescribed quantity had been absorbed. An excellent yield of substantially pure gentistic acid was obtained.

Example XVIII

The procedure described in Example VI was repeated utilizing ammonium sulfide in place of the sodium sulfide. An excellent yield of substantially pure gentisic acid was obtained.

Example XIX

The procedure described in Example VI was repeated utilizing 0.5 g. of $H_2S$ in place of the 0.5 g. of the sodium sulfide. The 0.5 g. of $H_2S$ was incorporated into the reaction mixture by bubbling $H_2S$ gas through the reaction mixture until the prescribed quantity had been absorbed. An excellent yield of substantially pure gentisic acid was obtained.

While specific reactants, quantities of reactants, temperatures and pressures have been set forth in the preceding examples, various phases of the novel process of this invention are subject to substantial variation. For example, the presence of the sulfide ion in the reaction mixture may be accomplished by incorporating into the reaction mixture any of the well known compounds containing a sulfide ion. Typical of such compounds are the alkali metal sulfides, such as sodium, potassium and lithium sulfides, ammonium sulfide, hydrogen sulfide, calcium sulfide, magnesium sulfide, manganic sulfide, manganous sulfide, and the various acid sulfides, such as, for example, the sodium, potassium, lithium, magnesium and calcium acid sulfides. The use of the alkali metal sulfides, ammonium sulfide and hydrogen sulfide constitute a preferred embodiment of this invention. The quantity of the sulfide ion utilized in the novel process of this invention may be varied over a substantial range. As low as 0.0001% and as high as 50% or higher, by weight based on hydroquinone, of the sulfide ion containing compound may be used advantageously. From a practical standpoint, however, there is little advantage to be gained in utilizing quantities of the sulfide ion containing compound in excess of 25% by weight based on the hydroquinone.

In this process, the $CO_2$ used to carboxylate the alkali metal or ammonium salt of hydroquinone may be autogenetically obtained from the initial reaction and the pressure autogenetically maintained within the prescribed range. It is not essential, however, that this reaction be carried out under strict autogenetic conditions, as the $CO_2$ obtained from the initial reaction between the alkali metal or ammonium carbonate or bicarbonate and hydroquinone may, in order to speed the reaction, be augmented by the introduction of $CO_2$ from an external source of supply.

In carrying out the novel process of this invention, it is preferred that approximately 2 molecular equivalents of the alkali metal or ammonium carbonate or bicarbonate be utilized for each molecular equivalent of hydroquinone. Thus, in the case of the alkali metal or ammonium bicarbonate, approximately 2 mols of the alkali metal or ammonium bicarbonate should be utilized for each mol of hydroquinone. In the case of the alkali metal or ammonium carbonate, approximately 1 mol of the alkali metal or ammonium carbonate should be utilized for each mol of hydroquinone. While stoichiometrical proportions of these reactants are prefered, these exact proportions of reactants, however, are not of a critical nature from the standpoint of this invention.

While the reaction must be carried out in a liquid medium, the quantity of liquid medium to be utilized is governed more by the nature of the equipment rather than by the chemistry of the reaction. Thus, sufficient medium should be utilized to provide for efficient agitation of the reaction mixture in the autoclave. This quantity will necessarily be governed by the nature of the reaction vessel, its construction and type of agitation provided. Fairly vigorous agitation should be utilized.

Since this reaction has now been found to take place in the presence of water, the liquid medium in which this reaction is carried out may be entirely water or it may be a liquid medium containing water. For example, the liquid medium may contain water and an organic solvent. In such instances, it is preferred that the liquid medium contain at least about 10% by weight of water. The balance of the medium may be any of the commonly used liquid organic solvents. For example, there may be used butanol, toluene, decahydronaphthalene, many of the natural gasoline factions, such as the one boiling in the range of from about 150° to 205° C., benzene, chlorobenzene, ortho-dichlorobenzene, and xylene. In such a liquid reaction medium, a concentration of water of less than about 10% by weight significantly reduces the amount of hydroquinone converted to gentisic acid. As the water content in such a medium is increased beyond 50% by weight, the conversion of hydroquinone appears to decrease to some extent until the concentration of water begins to approach 100%, at which time increased yields of gentistic acid are against realized. Thus, it is preferred in a medium made of water only in part that the concentration of water be maintained within the range of from about 10% to about 50% by weight.

The temperature limitations of this reaction are quite critical, and must be maintained within the range of from about 150° to 180° C. Above and below this temperature range significant losses in yield are encountered. Similarly, the pressure must be maintained in excess of about 200 pounds per square inch, and preferably within the range of from about 300 to 1,000 pounds per square inch. However, pressures of the order of 5,000 pounds per square inch may be utilized. As mentioned hereinbefore, this pressure may be maintained autogenetically or the $CO_2$ supply obtained from the formation of the alkali metal or ammonium salt of hydroquinone, augmented by the introduction of $CO_2$ from an external source of supply. While the reaction proceeds quite satisfactorily under autogenetic conditions, it has been found to be somewhat advantageous to apply an initial booster charge of about 150 pounds per square inch pressure of $CO_2$. This booster charge facilitates the starting of the reaction, after which time the pressure may be maintained autogenetically. It is also possible to begin the reaction under autogenetic conditions, and then supply additional $CO_2$ in order to raise the pressure within the prescribed range of above 200 pounds per square inch.

The time for the completion of the carboxylation reaction varies considerably with the nature of the equipment, method of agitation and the pressure and temperature utilized. Generally, the reaction is completed within from 8 to 16 hours.

After carboxylation, the crude alkali metal or ammonium salt of gentisic acid may be recovered by any of the convenient methods well-known to those skilled in the art. As a result of this invention, it has been found that the reaction mixture thus obtained contains a smaller quantity of tarry, highly colored side products as contaminants of the crude alkali metal or ammonium salt of gentisic acid obtained. For this reason, purification of the crude reaction product obtained according to the novel process of this invention is more readily accomplished. After the unreacted reactants have been removed from the reaction product, one crystallization of the alkali metal or ammonium salt of gentisic acid is usually all that is required in order to obtain a white crystalline product. If desired, the alkali metal or ammonium salt may be converted to gentisic acid by acidification and gentisic acid recovered directly. Here again, one recrystallization is usually sufficient to produce a white crystalline material.

What is claimed is:

1. In a process for the preparation of 2,5-dihydroxy-benzoic acid and its alkali metal and ammonium salts, the step comprising reacting a compound selected from the group consisting of the alkali metal and ammonium salts of hydroquinone with carbon dioxide in the presence of water and the sulfide ion, at a temperature in the range of from about 150° C. to about 180° C. and a pressure in excess of about 200 pounds per square inch.

2. In a process for the preparation of 2,5-dihydroxy-benzoic acid and its alkali metal and ammonium salts, the step comprising reacting hydroquinone with a compound selected from the group consisting of the alkali metal and ammonium carbonates and bicarbonates, in the presence of water and the sulfide ion, at a temperature in the range of from about 150° C. to about 180° C. and a pressure in excess of about 200 pounds per square inch.

3. In a process for the preparation of 2,5-dihydroxy-benzoic acid and its alkali metal and ammonium salts, the step comprising reacting hydroquinone with a compound selected from the group consisting of the alkali metal and ammonium carbonates and bicarbonates, and carbon dioxide in the presence of water and the sulfide ion, at a temperature in the range of from about 150° C. to about 180° C. and a pressure in excess of about 200 pounds per square inch.

4. In a process for the preparation of 2,5-dihydroxy-benzoic acid and its alkali metal and ammonium salts, the step comprising reacting hydroquinone with a compound selected from the group consisting of the alkali metal and ammonium carbonates and bicarbonates in water and in the presence of carbon dioxide and the sulfide ion, at a temperature in the range of from about 150° C. to about 180° C. and a pressure in excess of about 200 pounds per square inch.

5. In a process for the preparation of 2,5-dihydroxy-benzoic acid and its alkali metal and ammonium salts, the step comprising reacting hydroquinone with a compound selected from the group consisting of the alkali metal and ammonium carbonates and bicarbonates in water, and in the presence of carbon dioxide and a compound selected from the group consisting of the alkali metal sulfides, ammonium sulfide and hydrogen sulfide, at a temperature in the range of from about 150° C. to about 180° C. and a pressure in excess of about 200 pounds per square inch.

6. In a process for the preparation of 2,5-dihydroxybenzoic acid and its alkali metal and ammonium salts, the step comprising reacting hydroquinone with a compound selected from the group consisting of the alkali metal and ammonium carbonates and bicarbonates in water, and in the presence of carbon dioxide and an alkali metal sulfide, at a temperature in the range of from about 150° C. to about 180° C. and a pressure in excess of about 200 pounds per square inch.

7. In a process for the preparation of 2,5-dihydroxybenzoic acid and its sodium salt, the step comprising reacting hydroquinone with sodium bicarbonate in water, and in the presence of carbon dioxide and an alkali metal sulfide, at a temperature in the range of from about 150° C. to about 180° C. and a pressure in excess of about 200 pounds per square inch.

8. In a process for the preparation of 2,5-dihydroxybenzoic acid and its potassium salt, the step comprising reacting hydroquinone with potassium bicarbonate in water, and in the presence of carbon dioxide and an alkali metal sulfide, at a temperature in the range of from about 150° C. to about 180° C. and a pressure in excess of about 200 pounds per square inch.

9. In a process for the preparation of 2,5-dihydroxybenzoic acid and its potassium salt, the step comprising reacting hydroquinone with potassium carbonate in water, and in the presence of carbon dioxide and an alkali metal sulfide, at a temperature in the range of from about 150° C. to about 180° C. and a pressure in excess of about 200 pounds per square inch.

10. In a process for the preparation of 2,5-dihydroxybenzoic acid and its alkali metal and ammonium salts, the step comprising reacting hydroquinone with a compound selected from the group consisting of the alkali metal and ammonium carbonates and bicarbonates in water, and in the presence of carbon dioxide and ammonium sulfide, at a temperature in the range of from about 150° C. to about 180° C. and a pressure in excess of about 200 pounds per square inch.

11. In a process for the preparation of 2,5-dihydroxybenzoic acid and its alkali metal and ammonium salts, the step comprising reacting hydroquinone with a compound selected from the group consisting of the alkali metal and ammonium carbonates and bicarbonates in water, and in the presence of carbon dioxide and hydrogen sulfide, at a temperature in the range of from about 150° C. to about 180° C. at a pressure in excess of about 200 pounds per square inch.

12. In a process for the preparation of 2,5-dihydroxybenzoic acid and its alkali metal and ammonium salts, the step comprising reacting hydroquinone with a compound selected from the group consisting of alkali metal and ammonium carbonates and bicarbonates in a liquid medium containing an organic solvent and at least 10% by weight of water and in the presence of carbon dioxide and the sulfide ion, at a temperature in the range of from about 150° C. to about 180° C. and a pressure in excess of about 200 pounds per square inch.

13. In the process for the preparation of 2,5-dihydroxybenzoic acid and its alkali metal and ammonium salts, the step comprising reacting hydroquinone with a compound selected from the group consisting of the alkali metal and ammonium carbonates and bicarbonates in a liquid medium containing an organic solvent and from about 10% to about 50% by weight of water, in the presence of carbon dioxide and the sulfide ion, at a temperature in the range of from about 150° C. to about 180° C. and a pressure in excess of about 200 pounds per square inch.

14. In a process for the preparation of 2,5-dihydroxybenzoic acid and its alkali metal and ammonium salts, the step comprising reacting hydroquinone with a compound selected from the group consisting of the alkali metal and ammonium carbonates and bicarbonates in a liquid medium containing an organic solvent and from about 10% to about 50% by weight of water in the presence of carbon dioxide and a compound selected from the group consisting of the alkali metal sulfides, ammonium sulfide and hydrogen sulfide, at a temperature in the range of from about 150° C. to about 180° C. and a pressure in excess of about 200 pounds per square inch.

15. In a process for the preparation of 2,5-dihydroxybenzoic acid and its alkali metal and ammonium salts, the step comprising reacting hydroquinone with a compound selected from the group consisting of the alkali metal and ammonium carbonates and bicarbonates in a liquid medium containing ortho-dichlorobenzene and from about 10% to about 50% by weight of water in the presence of carbon dioxide and a compound selected from the group consisting of the alkali metal sulfides, ammonium sulfide and hydrogen sulfide, at a temperature in the range of from about 150° C. to about 180° C. and a pres- 16. In a process for the preparation of 2,5-dihydroxybenzoic acid and its alkali metal and ammonium salts, the step comprising reacting hydroquinone with a compound selected from the group consisting of the alkali metal and ammonium carbonates and bicarbonates in a liquid medium containing butanol and from about 10% to about 50% by weight of water in the presence of carbon dioxide and a compound selected from the group consisting of the alkali metal sulfides, ammonium sulfide and hydrogen sulfide, at a temperature in the range of from about 150° C. to about 180° C. and a pressure in excess of about 200 pounds per square inch.

17. In a process for the preparation of 2,5-dihydroxybenzoic acid and its alkali metal and ammonium salts, the step comprising reacting hydroquinone with a compound selected from the group consisting of the alkali metal and ammonium carbonates and bicarbonates in a liquid medium containing butanol and from about 10% to about 50% by weight of water in the presence of carbon dioxide and an alkali metal sulfide, at a temperature in the range of from about 150° C. to about 180° C. and a pressure in excess of about 200 pounds per square inch.

18. In a process for the preparation of 2,5-dihydroxybenzoic acid and its sodium salt, the step comprising reacting hydroquinone with sodium bicarbonate in a liquid medium containing butanol and from about 10% to about 50% by weight of water in the presence of carbon dioxide and an alkali metal sulfide, at a temperature in the range of from about 150° C. to about 180° C. and a pressure in excess of about 200 pounds per square inch.

19. In a process for the preparation of 2,5-dihydroxybenzoic acid and its potassium salt, the step comprising reacting hydroquinone with potassium bicarbonate in a liquid medium containing butanol and from about 10% to about 50% by weight of water in the presence of carbon dioxide and an alkali metal sulfide, at a temperature in the range of from about 150° C. to about 180° C. and a pressure in excess of about 200 pounds per square inch.

20. In a process for the preparation of 2,5-dihydroxybenzoic acid and its potassium salt, the step comprising reacting hydroquinone with potassium carbonate in a liquid medium containing butanol and from about 10% to about 50% by weight of water in the presence of carbon dioxide and an alkali metal sulfide, at a temperature in the range of from about 150° C. to about 180° C. and a pressure in excess of about 200 pounds per square inch.

21. In a process for the preparation of 2,5-dihydroxybenzoic acid and its alkali metal and ammonium salts, the step comprising reacting hydroquinone with a compound selected from the group consisting of the alkali metal and ammonium carbonates and bicarbonates in a liquid medium containing butanol and from about 10% to about 50% by weight of water in the presence of carbon dioxide and ammonium sulfide, at a temperature in the range of from about 150° C. to about 180° C. and a pressure in excess of about 200 pounds per square inch.

FERDINAND B. ZIENTY.
DOROTHY J. HARVEY.

REFERENCES CITED

The following references are of record in the file of this patent:

UNITED STATES PATENTS

| Number | Name | Date |
|---|---|---|
| 529,182 | Marasse | Nov. 13, 1894 |

FOREIGN PATENTS

| Number | Country | Date |
|---|---|---|
| 12,191 | Great Britain | 1889 |
| 888,483 | France | Dec. 14, 1943 |

OTHER REFERENCES

Drechsel, Zeit für Chemie, 8 Jahrg. 1865, pp. 580–581.

Senhofer et al., Beilstein (Handbuch, 4th ed.) vol. 10, pp. 377, 384 (1927).